United States Patent
Pitsianis et al.

(10) Patent No.: US 7,464,128 B1
(45) Date of Patent: Dec. 9, 2008

(54) METHODS AND APPARATUS FOR SINGLE STAGE GALOIS FIELD OPERATIONS

(75) Inventors: Nikos P. Pitsianis, Durham, NC (US); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 799 days.

(21) Appl. No.: 10/799,316

(22) Filed: Mar. 12, 2004

(51) Int. Cl.
G06F 7/00 (2006.01)

(52) U.S. Cl. ..................................... 708/492
(58) Field of Classification Search ................. 708/492
See application file for complete search history.

(56) References Cited

U.S. PATENT DOCUMENTS

| | | | |
|---|---|---|---|
| 4,162,480 A | 7/1979 | Berlekamp | |
| 4,852,098 A * | 7/1989 | Brechard et al. | 714/782 |
| 4,918,638 A | 4/1990 | Matsumoto et al. | |
| 6,134,572 A | 10/2000 | Wolf et al. | |
| 6,701,336 B1 * | 3/2004 | Shen et al. | 708/492 |
| 2004/0078555 A1 * | 4/2004 | Porten et al. | 712/221 |

* cited by examiner

Primary Examiner—Tan V Mai
(74) Attorney, Agent, or Firm—Priest & Goldstein, PLLC

(57) ABSTRACT

Techniques for single function stage Galois field (GF) computations are described. The new single function stage GF multiplication requires only m-bits per internal logic stage, a savings of m−1 bits per logic stage that do not have to be accounted for as compared with a previous two function stage approach. Also, a common design GF multiplication cell is described that may be suitably used to construct an m-by-m GF multiplication array for the calculation of $GF[2^m]/g[x]$. In addition, these techniques are further described in the context of packed data form computation, very long instruction word (VLIW) processing, and processing on multiple processing elements in parallel.

14 Claims, 8 Drawing Sheets

FIG. 1A
(PRIOR ART)

| MULTIPLICATION TERMS | = | CALCULATION RESULTS FOR p = 11101 & q = 10111 | CALCULATION RESULTS FOR p = 11101 & q = 10010 |
|---|---|---|---|
| S(0) | = | 000000000 | 000000000 |
| $q_4*p*x^4$ | = | 111010000   /131 | 111010000   /132 |
| $q_4*p*x^4 + S(0) = S(1)$ | = | 111010000 | 111010000 |
| $q_3*p*x^3$ | = | 000000000   /127 | 000000000   /128 |
| $q_3*p*x^3 + S(1) = S(2)$ | = | 111010000 | 111010000 |
| $q_2*p*x^2$ | = | 001110100   /123 | 000000000   /124 |
| $q_2*p*x^2 + S(2) = S(3)$ | = | 110100100 | 111010000 |
| $q_1*p*x$ | = | 000111010   /119 | 000111010   /120 |
| $q_1*p*x + S(3) = S(4)$ | = | 110011110 | 111101010 |
| $q_0*p*x^0$ | = | 000011101   /115 | 000000000   /116 |
| $q_0*p*x^0 + S(4) = S(5)$ | = | 110000011   /135 | 111101010   /136 |

| REMAINDER TERMS | = | CALCULATION RESULTS FOR $p = 11101$, $q = 10111$ AND $g = 10010$ | CALCULATION RESULTS FOR $p = 11101$, $q = 10010$ AND $g = 10010$ |
|---|---|---|---|
| $S(5) = S(M) = Z(1)$ | = | 110000011 | 111101010 |
| $Z(1)_8 * g * x^3$ | = | 100101000 | 100101000 |
| $Z(1)_8 * g * x^3 + Z(1) = Z(2)$ | = | 010101011 | 011000010 |
| $Z(2)_7 * g * x^2$ | = | 010010100 | 010010100 |
| $Z(2)_7 * g * x^2 + Z(2) = Z(3)$ | = | 000111111 | 001010110 |
| $Z(3)_6 * g * x$ | = | 000000000 | 001001010 |
| $Z(3)_6 * g * x + Z(3) = Z(4)$ | = | 000111111 | 000011100 |
| $Z(4)_5 * g * x^0$ | = | 000100101 | 000000000 |
| $Z(4)_5 * g * x^0 + Z(4) = Z(5)$ | = | 000011010 | 000011100 |
| THE GF PRODUCT | = | 11010 → $x^4 + x^3 + x$ | 11100 → $x^4 + x^3 + x^2$ |

FIG. 7A

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| Group | | S/P | | Unit | | MPYGF opcode | | | | | Rt | | | | | Rx | | | | | Ry | | | | | 0 | | CE2 | | MPack | |
| | | | | | | | | | | | Rte | | | | | 0 | Rxe | | | | 0 | | | Rye | | 0 | | | | | |

Syntax/Operation — 750

| Instruction | Operands | Operation | ACF |
|---|---|---|---|
| Quad Bytes | | | |
| MPYGF.[SP]M.4UB | Rt,Rx,Ry | Rt.B3 ←rem(Rx.B3*Ry.B3/PSR.B0)<br>Rt.B2 ←rem(Rx.B2*Ry.B2/PSR.B0) } 757<br>Rt.B1 ←rem(Rx.B1*Ry.B1/PSR.B0)<br>Rt.B0 ←rem(Rx.B0*Ry.B0/PSR.B0) —755 | NONE |
| [TF].MPYGF.[SP]M.4UB | Rt,Rx,Ry | Do operation only if T/F condition is satisfied in F0 | NONE |
| Octal Bytes | | | |
| MPYGF.[SP]M.8UB | Rte,Rxe,Rye | Rte.B3 ←rem(Rxe.B3*Rye.B3/PSR.B0)<br>Rte.B2 ←rem(Rxe.B2*Rye.B2/PSR.B0)<br>Rte.B1 ←rem(Rxe.B1*Rye.B1/PSR.B0)<br>Rte.B0 ←rem(Rxe.B0*Rye.B0/PSR.B0)<br>Rto.B3 ←rem(Rxo.B3*Ryo.B3/PSR.B0)<br>Rto.B2 ←rem(Rxo.B2*Ryo.B2/PSR.B0)<br>Rto.B1 ←rem(Rxo.B1*Ryo.B1/PSR.B0)<br>Rto.B0 ←rem(Rxo.B0*Ryo.B0/PSR.B0) | NONE |
| [TF].MPYGF.[SP]M.8UB | Rte,Rxe,Rye | Do operation only if T/F condition is satisfied in F0 | NONE |

752 { (first two rows)
754 { (last two rows)

METHODS AND APPARATUS FOR SINGLE STAGE GALOIS FIELD OPERATIONS

FIELD OF THE INVENTION

The present invention relates generally to improvements to digital signal processing and more particularly to advantageous methods and apparatus for providing improved Galois field operations.

BACKGROUND OF THE INVENTION

The operations of addition and multiplication utilizing Galois field (GF) arithmetic are very different from the usual multiply and add instructions in digital signal processors (DSPs). Specialized instructions are therefore typically needed to perform the computations in a reasonable amount of time. The specialized instructions specify the inputs, the result destination and the type of GF operation to be executed. A GF multiplication operation of two input elements is an important function which signal processing units and DSPs may need to perform. In considering GF operations, there are at least two different ways to encode the elements of a GF: 1) using the polynomial coefficients as a vector of bits, or 2) using the exponent form. Both of these two encodings make the calculation of one of the operations easy, but the other more complex to calculate. For example, the GF addition in utilizing the polynomial coefficients approach is an exclusive or (XOR), while a multiplication of two elements in exponent form is an addition of the exponents. However, the multiplication operation, utilizing the polynomial coefficient form, and, the addition operation, utilizing the exponent form, are typically both more complex to implement.

Further details of several prior art approaches are found in the following patents: "Galois Field Computer," U.S. Pat. No. 4,162,480, "Multiplier in a Galois Field," U.S. Pat. No. 4,918,638, and "Galois Field Arithmetic Apparatus and Method," U.S. Pat. No. 6,134,572. The first patent describes a table lookup for the GF multiplication of $GF(2^5)$. The second patent uses two function stages to calculate a GF multiplication utilizing a binary multiplier array for a first function stage and a polynomial reducer for the second function stage. The third patent uses the exponent representation form.

SUMMARY OF THE INVENTION

Galois fields (GF) and the multiplication operation in such fields, have many applications in communication systems. Some examples are their utilization for error detection and/or correction, for cryptography, and the like. Due to the special meaning of GF multiplication, however, standard signal processors typically are inefficient in performing such a computation. It is therefore important to consider techniques and designs to efficiently compute the operations needed in a signal processor, such as a DSP or a fixed function signal processor, over different Galois extension fields and generator polynomials. The present invention advantageously calculates the GF multiplication in polynomial coefficients form as a single function stage calculation by merging two function stages into a single new function stage. The new single function stage $GF(2^m)$ multiplication further advantageously uses an m-by-m single function stage calculation array utilizing only m-bits per internal logic stage as compared with the previous two function stage approach of U.S. Pat. No. 4,918,638, which calculated $2m-1$ bits from the first stage multiplication array as inputs to the second stage polynomial reducer. The present invention provides a savings of $m-1$ bits per logic stage that do not need to be accounted for in the internal array implementation. One regular m-by-m array in accordance with the invention may be constructed by replicating a common cell circuit design allowing for further optimizations, for example, using custom logic design techniques to produce a common cell that is of higher performance and reduced area. In addition, the GF multiplication array can be physically instantiated multiple times and used by DSP software programs with a specialized instruction to perform multiple GF multiplications on multiple data elements in a packed data format. For parallel DSPs with multiple processing elements (PEs), the specialized instruction can be used in programs to perform the packed data format GF multiplications on the multiple PEs in parallel.

These and other advantages and aspects of the present invention will be apparent from the drawings and the Detailed Description which follow below.

BRIEF DESCRIPTION OF THE DRAWINGS

FIG. 1A illustrates a first function stage for computing polynomial multiplication terms in a traditional two function stage GF multiplication approach showing exemplary calculation traces for two polynomial multiplications;

FIGS. 1B and 1C illustrate the first function stage polynomial multiplications as if done by hand for the two examples of FIG. 1A;

FIG. 2 illustrates a second function stage for performing polynomial division in a traditional two function stage approach showing two reductions of the two dividends from FIG. 1A to generate two remainders which are the result of the GF multiplications;

FIG. 7A illustrates an exemplary encoding format for a packed data finite field multiply instruction (MPYGF) in accordance with the present invention; and FIG. 7B shows a syntax/operation table for the MPYGF instruction of FIG. 7A.

DETAILED DESCRIPTION

Figure 3A:
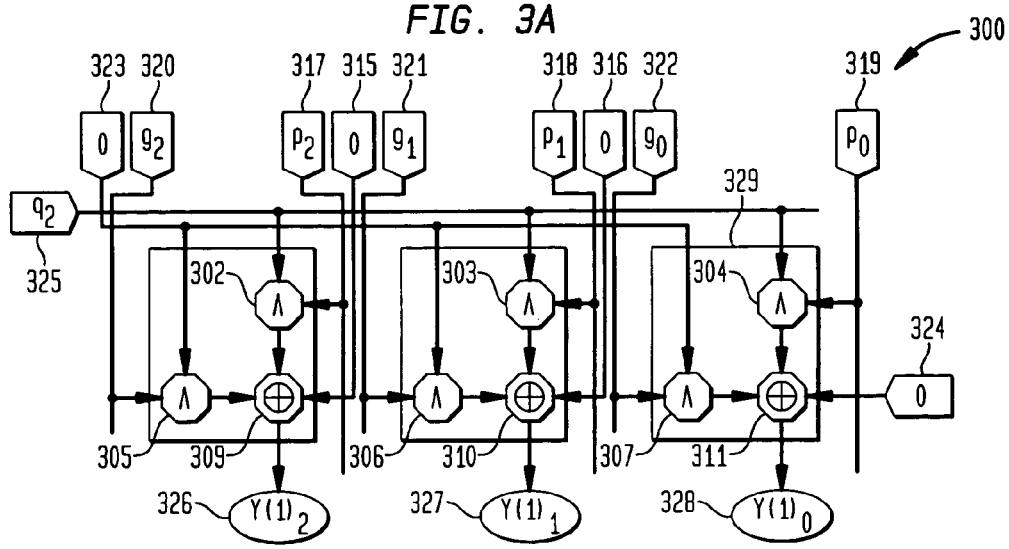
FIG. 3A illustrates a first logic stage with i=1 calculating Y(1) for m=3 in accordance with the present invention.

To provide context for a hardware implementation, and instructions and software techniques for GF multiplication in accordance with the present invention, a brief description of GF arithmetic follows below. A field $F(S,+,*,0,1)$ defines an algebraic entity consisting of a set of elements S, two arithmetic operations, addition and multiplication, denoted by the symbols + and *, respectively, closed over S and the corresponding identity elements for these operations, denoted by 0 and 1, respectively. A Galois field is a defined subset of a general field which is a set, such as the set of rational numbers, that can be manipulated by the mathematical operations of addition and multiplication. A Galois field is represented as GF(q) where q represents the finite number of elements of the field, for this case the integers $\{0, 1, \ldots, q-1\}$. For example, let q=2 such that GF(2) has elements $\{0, 1\}$. An extension field of interest is $GF(2^m)$ where m is a positive integer. This Galois field has $2^m$ elements of the vector space of dimension m over GF(2). It has been proven that every finite field is isomorphic to a Galois field. Also, any field $GF(2^m)$ can be generated using a primitive polynomial P of degree m over GF(2), and the arithmetic performed in the $GF(2^m)$ field is modulo this primitive polynomial.

A traditional implementation of GF multiplication consists of two function stages, which perform the GF multiplication much as it would be computed by hand. For further exemplary details of such an implementation, see U.S. Pat. No. 4,918,638. During a first function stage, a polynomial multiplication is implemented, where the polynomials have coefficients from GF[2]. This operation is a modification of a typical multiplier where the carries are not calculated or propagated. In the second function stage, the corresponding polynomial division by the generator polynomial is implemented where the remainder is calculated as discussed further below.

The GF multiplication can be derived as follows: let g[x] be the generator polynomial of $GF[2^m]$. Let polynomials p[x] and q[x] be members of $GF[2^m]/g[x]$. The GF multiplication is the calculation of the remainder of the polynomial division of the product p[x]*q[x] divided by g[x] in GF[2] arithmetic. It is noted that a polynomial with coefficients in GF[2] multiplied by the monomial $x^m$ is equivalent to shifting the bit vector of the polynomial coefficients to the left m positions with zero fill in. Polynomial addition is equivalent to performing a bit wise exclusive or (XOR) operation. Also, note that subscripts represent a specific bit position in a bit vector, the asterisk symbol (*) represents bit ANDs, and the symbols + and ⊕ represent the XOR operation.

Polynomial multiplication may be calculated by a recurrence relation equation 1 that defines the polynomial S(i):

$$S(i)=S(i-1)+q_{m-i}*p*x^{m-i}, \text{ for } i=1 \ldots m, \text{ and where } S(0)=0 \quad \text{Equation 1}$$

where S(m) is the polynomial product of p[x]*q[x]. For example, FIG. 1A shows a first stage polynomial multiplication table 100 with equation 1 multiplication terms 102 and calculation results 104 and 106 for a common input $p=(p_4\ p_3\ p_2\ p_1\ p_0)$ and two different inputs $q=(q_4\ q_3\ q_2\ q_1\ q_0)$ for m=5. For calculation results 104, p=11101 and q=10111. For calculation results 106, p=11101 and q=10010. FIGS. 1B and 1C show multiplication operations 150 and 170 for the two examples 104 and 106, respectively, of FIG. 1A as if done by hand.

The polynomial remainder of the division of p[x]*q[x] divided by g[x] is calculated by the recurrence relation equation that defines the polynomial Z(i):

$$Z(i)=Z(i-1)+Z(i-1)_{2m-i}*g*x^{m-i}, \text{ for } i=2 \ldots m, \text{ and where } Z(1)=S(m) \quad \text{Equation 2}$$

The remainder is given by the least significant m-bits of Z(m).

In one traditional approach to GF multiplication in which polynomial multiplication is followed by a polynomial division, the result of the multiplication becomes the dividend for the reduction operation. For example, FIG. 2 illustrates a second polynomial division stage reduction operation 200 where remainder terms 202 and division operations 204 and 206 continue the examples shown in FIG. 1A. The generator polynomial is $g(x)=x^5+x^2+1$, that is, the coefficients of the divisor are given in binary form as (100101). For the first example of a division operation 204, the binary dividend (110000011) 210 corresponds to the polynomial $x^8+x^7+x+1$. In the other example of a division operation 206, the binary dividend (111101010) 212 corresponds to the polynomial $x^8+x^7+x^6+x^5+x^3+x$.

Returning to FIG. 1A, the equation 1 multiplication terms 102 with m=5, are as follows:

$$S(0)=0 \quad 107$$

$$S(1)=S(0)+q_4*p*x^4=q_4*p*x^4 \quad 108$$

$$S(2)=S(1)+q_3*p*x^3=q_4*p*x^4+q_3*p*x^3 \quad 109$$

$$S(3)=S(2)+q_2*p*x^2=q_4*p*x^4+q_3*p*x^3+q_2*p*x^2 \quad 110$$

$$S(4)=S(3)+q_1*p*x^1=q_4*p*x^4+q_3*p*x^3+q_2*p*x^2+q_1*p*x^1 \quad 111$$

$$S(m)=S(5)=S(4)+q_0*p*x^0=q_4*p*x^4+q_3*p*x^3+q_2*p*x^2+q_1*p*x^1+q_0*p*x^0 \quad 112$$

The exemplary multiplication operations shown in FIGS. 1B and 1C include reference numbers corresponding to those in the calculation result columns 104 and 106 of FIG. 1A. Note that equation 1 generates 2m−1 bits, as can be seen for the result S(5) 112 and the examples 150 and 170. Thus, the results 135 and 136 have 2(5)−1 or 9 bits. It is further noted that for GF multiplication, the carries are not calculated or propagated.

Next equation 2 is discussed with reference numbers included in the equation steps corresponding to the rows of the exemplary calculations shown in FIG. 2. FIG. 2 shows remainder terms 202, calculation results 204 for p=11101, q=10111 and g=10010, and calculation results 206 for p=11101, q=10010 and g=10010. For m=5 and i=1, the first term Z(1) is defined as:

$$Z(1)=S(m)=S(5) \quad 208$$

For i=2, the next term Z(2) is:

$$Z(2)=Z(1)+Z(1)_8*g*x^3 \quad 214$$

For i=3, the next term Z(3) is:

$$Z(3)=Z(2)+Z(2)_7*g*x^2 \quad 220$$

For i=4, the next term Z(4) is:

$$Z(4)=Z(3)+Z(3)_6*g*x^1 \quad 226$$

For i=5, the next term Z(5) is:

$$Z(5)=Z(4)+Z(4)_5*g*x^0 \quad 232$$

For calculation results of the division operations 204 and 206 of FIG. 2, equation 2 specifies the remainders, and thus the GF products 240 and 242, which are (11010) and (11100), respectively. The first GF product 240 corresponds to $x^4+x^3+x$ and the second GF product 242 corresponds to $x^4+x^3+x^2$. Note that the calculation of equation 2 requires the use of 2m−1 bits as shown in each calculation step in the table 200 calculation results columns 204 and 206.

With the above discussion of FIGS. 1A, 1B and 2 as background, it is next shown how the present invention computes the GF multiplication in a single new function stage. In the approach of the present invention, equation 2 is expanded by incorporating the input Z(1)=S(m) terms and combining the terms in the equation in such a way as to create a new and different recurrence relation that represents a single function stage calculation of a GF($2^m$) multiplication.

For m=5 and i=1, the first term Z(1) is defined as:

$$Z(1)=S(m)=S(5)=q_4{*}p{*}x^4+q_3{*}p{*}x^3+q_2{*}p{*}x^2+q_1{*}p{*}x^1+q_0{*}p{*}x^0$$

Using equation 2 and i=2, the next term Z(2) can be written as:

$$Z(2)=Z(1)+Z(1)_8{*}g{*}x^3$$

Substituting for Z(1) leads to:

$$Z(2)=q_4{*}p{*}x^4+q_3{*}p{*}x^3+q_2{*}p{*}x^2+q_1{*}p{*}x^1+q_0{*}p{*}x^0+Z(1)_8{*}g{*}x^3$$

Combining the common $x^3$ terms of the input S(5), $q_3{*}p{*}x^3$, with the division recurrence term, $Z(1)_8{*}g{*}x^3$, changes the nature of the equation being evaluated as can be seen in the following steps and discussed further below. The Z(2) term using combined input terms is:

$$Z(2)=q_4{*}p{*}x^4+(q_3{*}p+Z(1)_8{*}g){*}x^3+q_2{*}p{*}x^2+q_1{*}p{*}x^1+q_0{*}p{*}x^0$$

Using equation 2 and i=3, the next term Z(3) can be written as:

$$Z(3)=Z(2)+Z(2)_7{*}g{*}x^2$$

Substituting for Z(2) leads to:

$$Z(3)=q^4p{*}x^4+(q_3{*}p+Z(1)_8{*}g){*}x^3+q_2{*}p{*}x^2+q_1{*}p{*}x^1+q_0{*}p{*}x^0+Z(2)_7{*}g{*}x^2$$

Combining the common $x^2$ terms of the input S(5), $q_2{*}p{*}x^2$, with the division recurrence term, $Z(2)_7{*}g{*}x^2$, yields:

$$Z(3)=q^4{*}p{*}x^4+(q_3{*}p+Z(1)_8{*}g){*}x^3+(q_2{*}p+Z(2)_7{*}g){*}x^2+q_1{*}p{*}x^1+q_0{*}p{*}x^0$$

Using equation 2 and i=4, the next term Z(4) can be written as:

$$Z(4)=Z(3)+Z(3)_6{*}g{*}x^1$$

Substituting for Z(3) leads to:

$$Z(4)=q^4{*}p{*}x^4+(q_3{*}p+Z(1)_8{*}g){*}x^3+(q_2{*}p+Z(2)_7{*}g){*}x^2+q_1{*}p{*}x^1+q_0{*}p{*}x^0+Z(3)_6{*}g{*}x^1$$

Combining the common $x^1$ terms of the input S(5), $q_1{*}p{*}x^1$, with the division recurrence term, $Z(3)_6{*}g{*}x^1$, yields:

$$Z(4)=q^4{*}p{*}x^4+(q_3{*}p+Z(1)_8{*}g){*}x^3+(q_2{*}p+Z(2)_7{*}g){*}x^2+(q_1{*}p+Z(3)_6{*}g){*}x^1+q_0{*}p{*}x^0$$

Using equation 2 and i=5, the next term Z(5) can be written as:

$$Z(5)=Z(4)+Z(4)_5{*}g{*}x^0$$

Substituting for Z(4) leads to:

$$Z(5)=q^4{*}p{*}x^4+(q_3{*}p+Z(1)_8{*}g){*}x^3+(q_2{*}p+Z(2)_7{*}g){*}x^2+(q_1{*}p+Z(3)_6{*}g){*}x^1+q_0{*}p{*}x^0+Z(4)_5{*}g{*}x^0$$

Combining the common $x^0$ terms of the input S(5), $q_0{*}p{*}x^0$, with the division recurrence term, $Z(4)_5{*}g{*}x^0$, yields:

$$Z(5)=q_4{*}p{*}x^4+(q_3{*}p+Z(1)_8{*}g){*}x^3+(q_2{*}p+Z(2)_7{*}g){*}x^2+(q_1{*}p+Z(3)_6{*}g){*}x^1+(q_0{*}p+Z(4)_5{*}g){*}x^0 \quad \text{Equation 3}$$

Due to the combining of the common input terms with the division recurrence terms, equation 3 represents a new recurrence relation that can be written in a general form as follows:

$$Y(i)=Y(i-1)+(q_{m-i}{*}p+Y(i-1)_{2m-i}{*}g){*}x^{m-i}, i=1, 2, \ldots, m \text{ and where } Y(0)=0 \quad \text{Equation 4}$$

Note that Y(m)=Z(m) but, because of the combining of the terms as described above, Y(a)≠Z(a) when a<m. The intermediate terms Y(a) are not output results and the final answer Y(m) is all that is needed. Equation 4 can be implemented as an advantageous merging of the two previously separate function stages into a single function stage that is represented by the new recurrence relation equation 4. As indicated by Equation 4, there is no inherent algorithmic limitation to handling arbitrary values of m with the approach of the present invention.

Equation 4 can be simplified further by examining the $Y(i-1)_{2m-i}$ term by first specifying i as i−1 and then substituting i−1 into Equation 4 for the purpose of determining the 2m−i bit. $Y(i-1)_{2m-i}=(Y(i-2)+(q_{m-(i-1)}{*}p+Y(i-2)_{2m-(i-1)}{*}g){*}x^{m-(i-1)})_{2m-i}$, which is valid for i=2, 3, . . . , m and where Y(0)=0. Because polynomial addition is equivalent to performing a bit wise exclusive or operation with no carries calculated, a bit of a vector exclusive or result is equal to the exclusive or of the input bits. Thus:

$$Y(i-1)_{2m-i}=Y(i-2)_{2m-i}+((q_{m-(i-1)}{*}p+Y(i-2)_{2m-(i-1)}{*}g){*}x^{m-(i-1)})_{2m-i}.$$

As noted earlier, a polynomial with coefficients in GF[2] multiplied by the monomial $x^m$ is equivalent to shifting the bit vector of the polynomial coefficients to the left m positions with zero fill in. Consequently, a bit represented by $(A{*}x^{m-(i-1)})_{2m-i}$ is equivalent to $A_{2m-i-(m-(i-1))}=A_{m-1}$. Therefore, $Y(i-1)_{2m-i}=Y(i-2)_{2m-i}+(q_{m-i+1}{*}p+Y(i-2)_{2m-i+1}{*}g)_{2m-i-(m-(i-1))}$ and simplifying yields:

$$Y(i-1)_{2m-i}=Y(i-2)_{2m-i}+(q_{m-i+1}{*}p+Y(i-2)_{2m-i+1}{*}g)_{m-1} \quad \text{Equation 5}$$

which is valid for i=2, 3, . . . , m and where Y(0)=0.

It can be deduced from the Equation 5 recurrence relation that $Y(i-1)_{2m-i}$ begins with a $Y(0)_{2m-i}$ term, i=2, and all other terms for i=2, 3, . . . , m are each the m−1 bit of a previous calculation. Consequently, since $Y(0)_{2m-i}=Y(0)_{m-1}=0$, $Y(i-1)_{2m-i}$ can be stated as:

$$Y(i-1)_{2m-i}=Y(i-1)_{m-1} \text{ for i=2, 3, \ldots, m and where } Y(0)=0 \quad \text{Equation 6}$$

Equation 4 can then be rewritten using Equation 6 as follows:

$$Y(i)=Y(i-1)+(q_{m-i}{*}p+Y(i-1)_{m-1}{*}g){*}x^{m-i}, i=1, 2, \ldots, m \text{ and where } Y(0)=0 \quad \text{Equation 7}$$

Equation 7 has been verified by a C program routine for polynomials up to degree 8, or equivalently, elements of GF($2^m$) for m less than or equal to 8, but there does not appear to be any inherent algorithmic limitation to handling arbitrary values of m. By way of example, a hardware implementation of equation 7 is described below in conjunction with the discussion of FIGS. 3A, 3B and 3C.

Equation 7 for m=3 becomes:

$$Y(i)=Y(i-1)+(q_{3-i}{*}p+Y(i-1)_2{*}g){*}x^{3-i}, i=2, 3 \text{ and where } Y(0)=0 \quad \text{Equation 8}$$

For i=1:

$$Y(1)=Y(0)+(q_2{*}p+Y(0)_2{*}g){*}x^2=0+(q_2{*}p+0{*}g){*}x^2 \quad \text{Equation 9}$$

Equation 9 can be implemented in an exemplary circuit 300 as shown in FIG. 3A. In FIGS. 3A, 3B, 3C, 4, and 5, AND gates are represented by a hexagon with a ˆsymbol and exclusive or (XOR) gates are represented by a hexagon with a ⊖ symbol. In FIG. 3A, the term $q_2{*}p$ is generated by AND gates 302-304 and the term $0{*}g$ is generated by AND gates 305-307. The two sum (+) exclusive ors of equation 9 are combined in the three input XOR gates 309-311. The components of the Y(0) term of Equation 9 are equal to zero by definition of equation 8 and, consequently, zero values are applied to the inputs 315 and 316. The p inputs ($p_2$, $p_1$, and $p_0$) are applied to inputs 317, 318 and 319, respectively, and the generator polynomial coefficients g inputs ($g_2$, $g_1$, and $g_0$) are applied to inputs 320, 321 and 322, respectively. The input $Y(0)_2=0$ is provided on input 323, a zero is provided on input 324 being at the edge of the array, and $q_2$ is provided on input 325. The results $Y(1)_2$, $Y(1)_1$, and $Y(1)_0$ of circuit 300 appear at outputs 326, 327, and 328, respectively. To allow the use of a common cell for implementing the array, a third XOR input on border cells, such as input 324 of cell 329 is set to zero.

Continuing for i=2:

$$Y(2)=Y(1)+(q_1*p+Y(1)_2*g)*x^1=(q_2*p+0*g)*x^2+(q_1*p+Y(1)_2*g)*x^1 \quad \text{Equation 10}$$

Figure 3B:
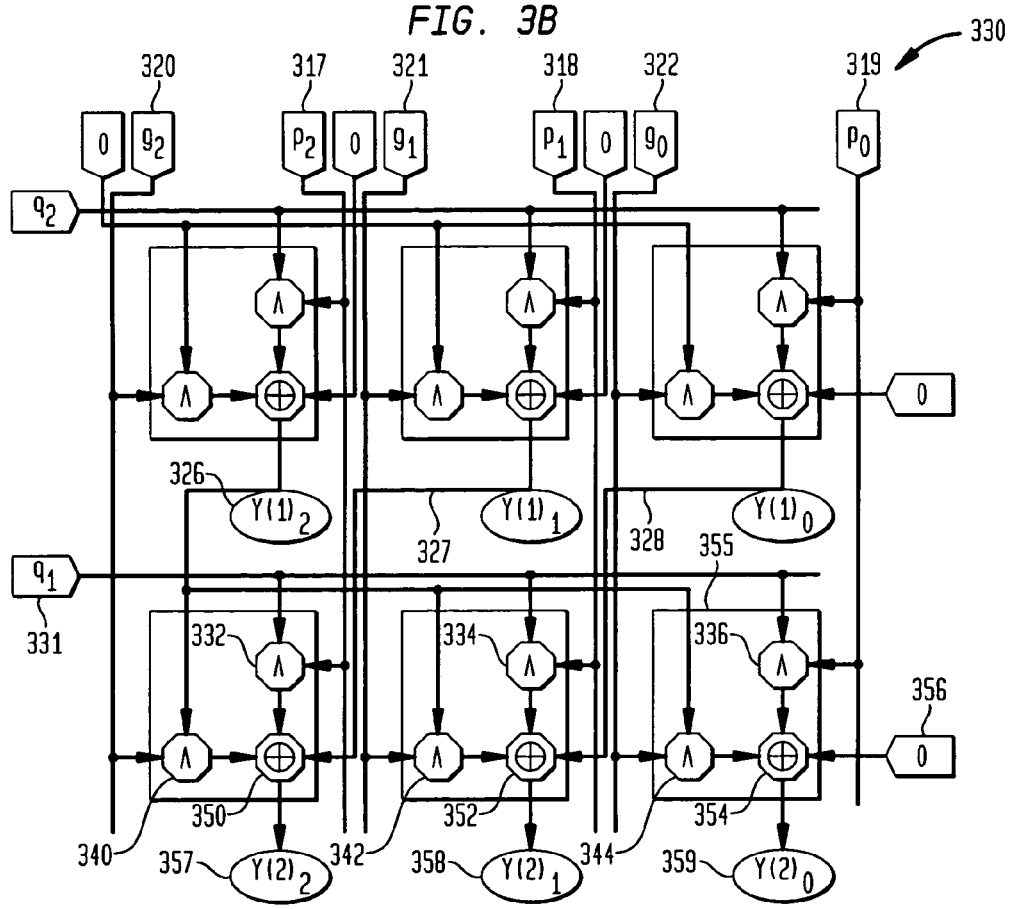
FIG. 3B illustrates first and second logic stages with i=2 calculating Y(2) for m=3 in accordance with the present invention.

Equation 10 can be implemented in an exemplary circuit 330 as shown in FIG. 3B. In FIG. 3B, the term $q_1*p=q_1$ 331*($p_2$ 317 $p_1$ 318 $p_0$ 319) is generated by AND gates 332-336 and the term $Y(1)_2*g=Y(1)_2$ 326*($g_2$ 320 $g_1$ 321 $g_0$ 322) is generated by AND gates 340-344. The two required sum (+) exclusive ors are combined in the three input XOR gates 350-354. Note that due to the $x^2$ and $x^1$ terms in Equation 10, there is a shift of 1 bit in the exclusive or inputs accounting for paths 327 and 328 for $Y(1)_1$, and $Y(1)_0$, respectively. Border cell 355 has its XOR third input 356 set to zero. The results of circuit 330 are outputs $Y(2)_2$ 357, $Y(2)_1$ 358, and $Y(2)_0$ 359.

Continuing for i=3:

$$Y(3)=Y(2)+(q_0*p+Y(2)_2*g)*x^0$$

$$Y(3)=(q_2*p+0*g)*x^2+(q_1*p+Y(1)_2*g)*x^1+(q_0*p+Y(2)_2*g)*x^0 \quad \text{Equation 11}$$

Figure 3C:
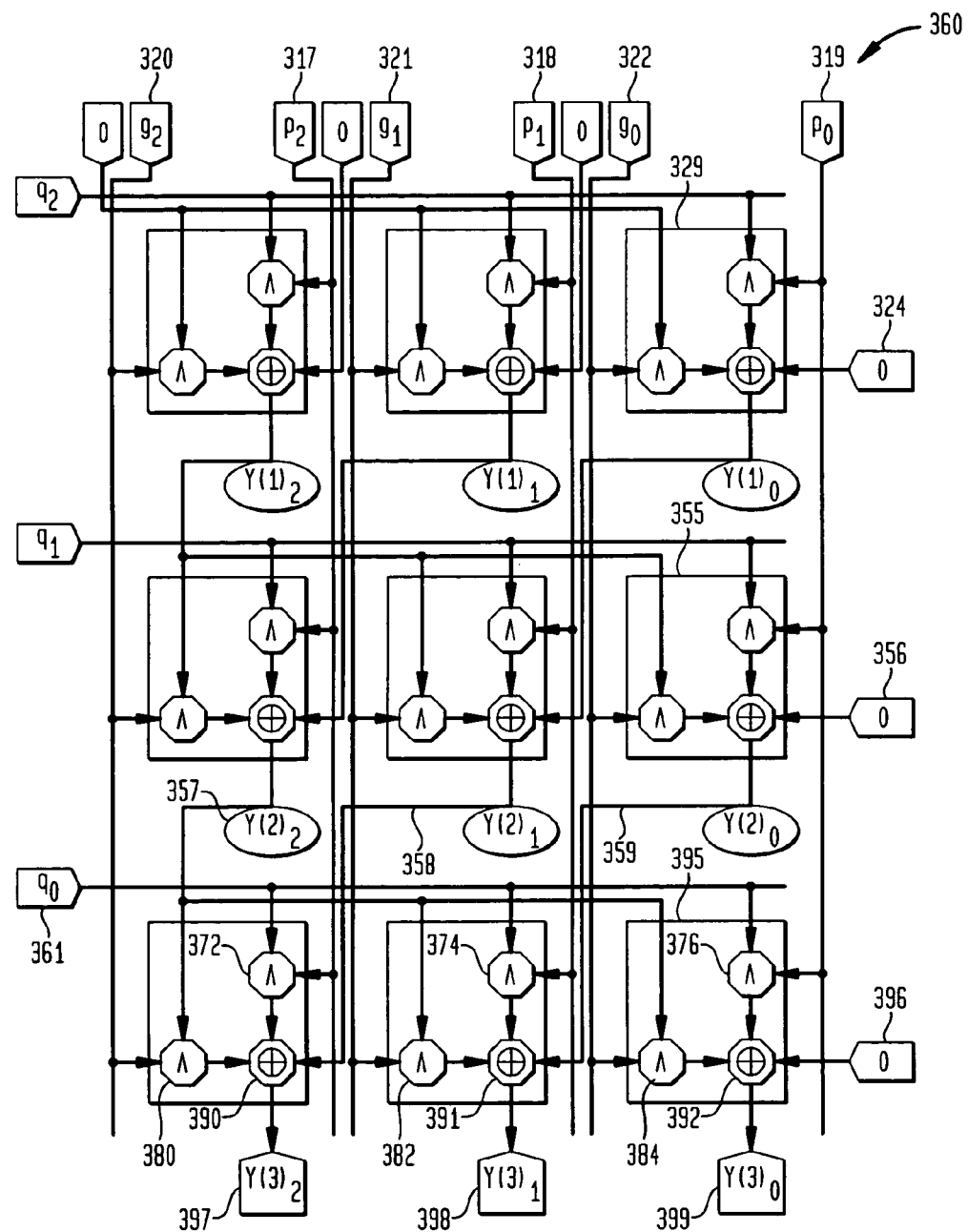
FIG. 3C illustrates first, second and third logic stages with i=3 calculating Y(3), the GF multiplication result, for m=3 in accordance with the present invention.

Equation 11 can be implemented in an exemplary circuit 360 shown in FIG. 3C where the term $q_0*p=q_0$ 361*($p_2$ 317 $p_1$ 318 $p_0$ 319) is generated by AND gates 372-376 and the term $Y(2)_2*g=Y(2)_2$ 357*($g_2$ 320 $g_1$ 321 $g_0$ 322) is generated by AND gates 380-384. The two required sum (+) exclusive ors are combined in the three input XOR gates 390-392. Note that due to the $x^0$ term in Equation 11 there is a shift of 1 bit in the exclusive or inputs accounting for paths 358 and 359 for $Y(2)_1$ and $Y(2)_0$, respectively. Border cell 395 has its XOR third input 396 set to zero. The results of circuit 360 are outputs $Y(3)_2$ 397, $Y(3)_1$ 398, and $Y(3)_0$ 399.

It is noted that the above described implementation of equation 7 requires only m bits for each logic stage, as shown in the exemplary circuits of FIGS. 3A, 3B, and 3C. By contrast, the previous calculation techniques for the examples of FIGS. 1A-1C and FIG. 2 required 2m−1 bits per logic stage. This reduction represents a savings of m−1 bits per internal logic stage that do not have to be accounted for in an implementation.

Figure 4:
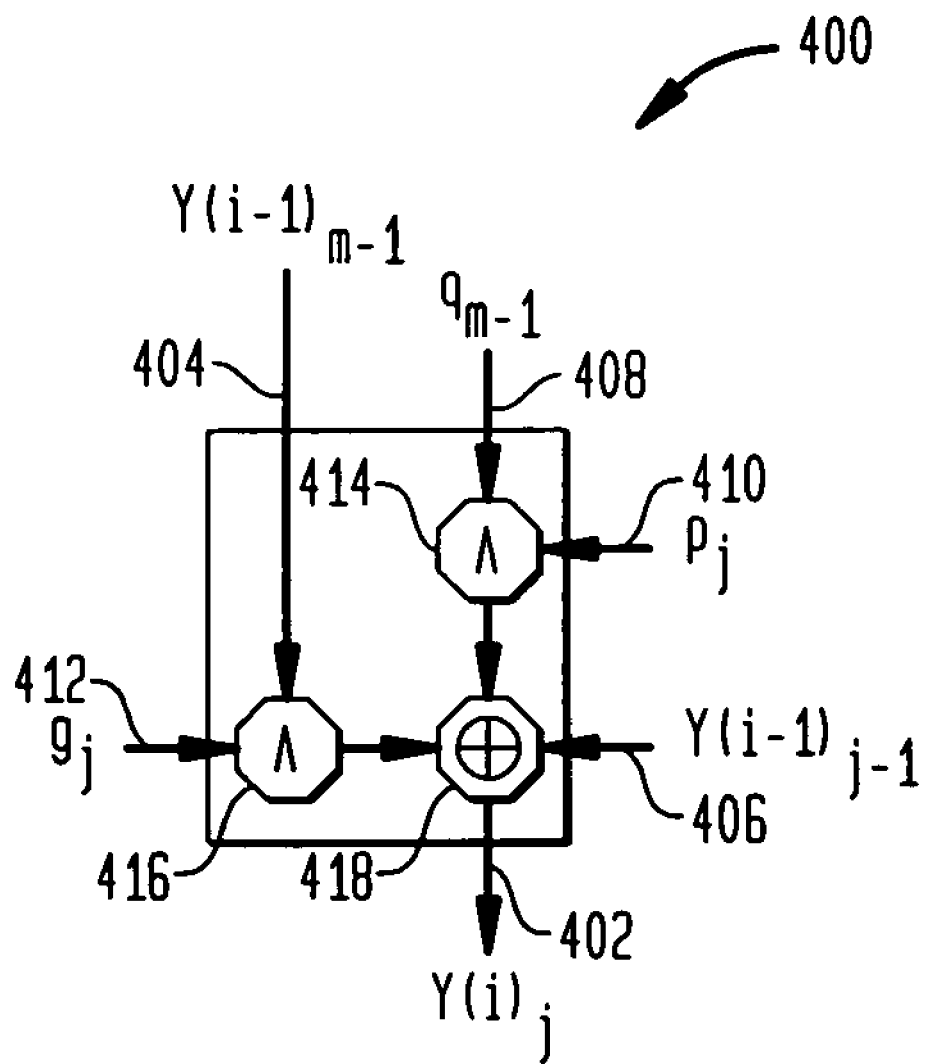
FIG. 4 illustrates a GF multiplication cell for construction of an m-by-m GF multiplication array in accordance with the present invention.

FIG. 4 illustrates a GF multiplication cell 400 where cell output bit $Y(i)_j$ 402 depends on the most significant bit of the previous calculation $Y(i-1)_{m-1}$ 404, the value of its right neighbor bit $Y(i-1)_{j-1}$ 406 the result of the previous calculation, bit $q_{m-i}$ 408, bit $p_j$ 410, and bit $g_j$ 412. Internal to the GF multiplication cell 400 are two 2-input AND gates 414 and 416 and a 3-input XOR gate 418. The three logic gates are connected based on Equation 7, repeated here for easy reference to the logic gates of FIG. 4, $Y(i)=Y(i-1)+(q_{m-i}*p+Y(i-1)_{m-1}*g)*x^{m-i}$. The $q_{m-i}*p$ AND is accomplished for the $j^{th}$ bit position by AND gate 414, the $Y(i-1)_{m-1}*g$ AND for the $j^{th}$ bit position is accomplished by the AND gate 416, the XOR of these two AND results is accomplished by XOR gate 418. The third input 406 to the XOR gate 418 is for the $Y(i-1)_{j-1}$ term, which, due to the $x^{m-i}$ term of equation 7, has a shift of one bit between the previous $Y(i-1)$ value and the $(q_{m-i}*p+Y(i-1)_{m-1}*g)$ value. This one-bit shift is accomplished for the bit position $Y(i)_j$ 402 by XOR 418 having its third input being the previous Y term shifted by 1 bit, in other words bit $Y(i-1)_{j-1}$ 406.

Note that for border cells on the rightmost edge of a GF multiplication array, for example, cells 329, 355 and 395 as shown in FIG. 3C, the third XOR inputs, 324, 356, and 396, respectively, are set to zero. The same is true for input 406 in general cell 400 when the cell is used as a border cell on the rightmost edge of a GF multiplication array. A regular m-by-m array is constructed by replicating a common cell circuit design, such as circuit 400 of FIG. 4, allowing for further optimizations, for example, using custom logic design techniques to produce a common cell that is of higher performance and reduced area.

Figure 5:
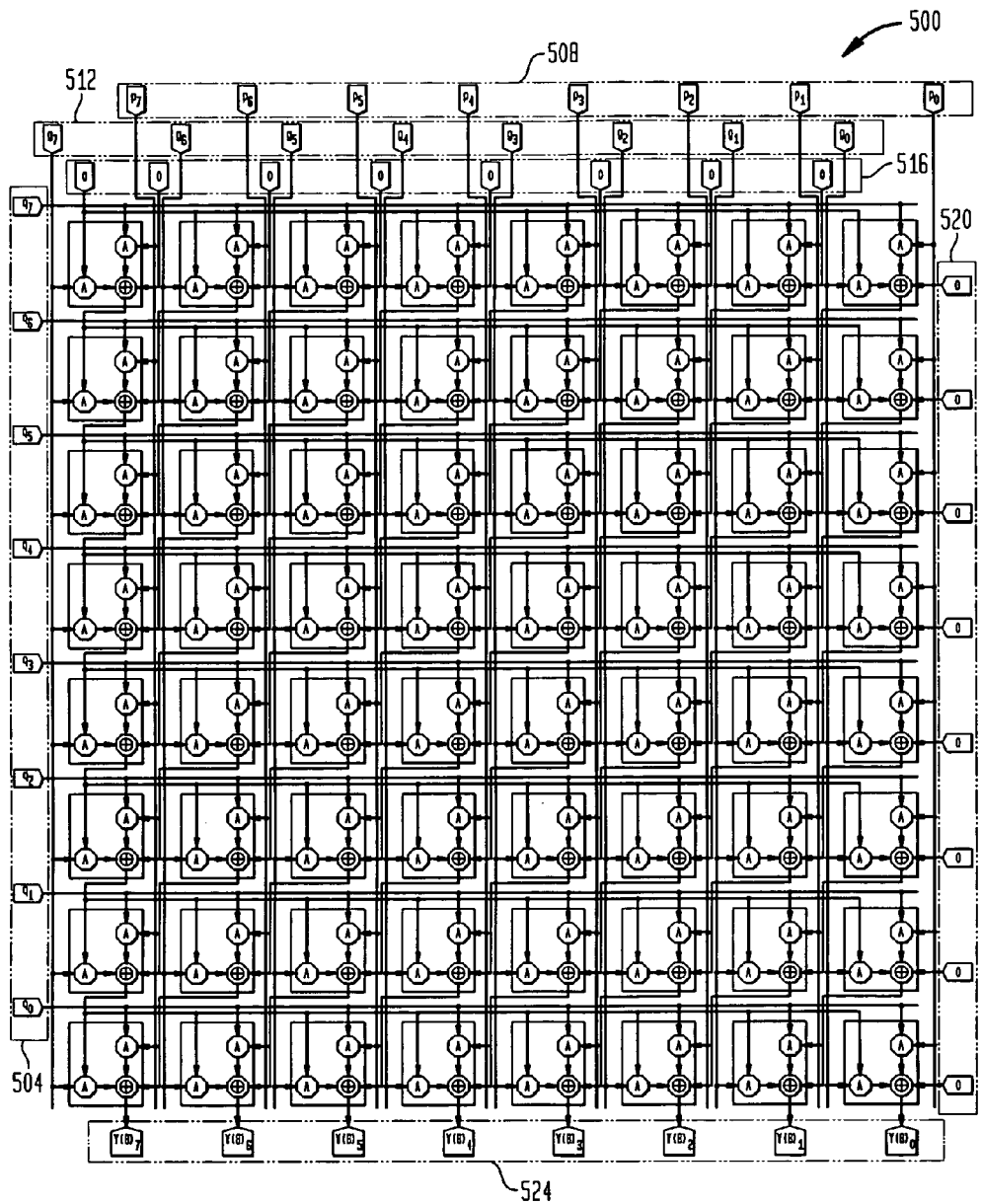
FIG. 5 illustrates a single m=8 GF multiplication unit which may suitably be used in a ManArray architecture processor in accordance with the present invention.

A single exemplary m=8 GF multiplication unit 500 is shown in FIG. 5. Unit 500 consists of an m-by-m=8×8 array of the GF cells 400 shown in FIG. 4. The inputs q=($q_7$ $q_6$ $q_5$ $q_4$ $q_3$ $q_2$ $q_1$ $q_0$) 504, p=($p_7$ $p_6$ $p_5$ $p_4$ $p_3$ $p_2$ $p_1$ $p_0$) 508, g=($g_7$ $g_6$ $g_5$ $g_4$ $g_3$ $g_2$ $g_1$ $g_0$) 512 are provided from an external source such as the read ports of at least two registers or a register file or memory device. The $Y(i-1)_{m-1}$ and the $Y(i-1)_{j-1}$ array border GF multiplication circuit cell input values 516 and 520 are set to 0. The result Y=($Y(8)_7$ $Y(8)_6$ $Y(8)_5$ $Y(8)_4$ $Y(8)_3$ $Y(8)_2$ $Y(8)_1$ $Y(8)_0$) output 524 is provided to an external destination such as the write port of a register or a register file or memory device.

The present invention computes the GF multiplication in a single stage. In one implementation, it may be embodied as an instruction for the MANARRAY™ architecture wherein 8 GF multipliers are incorporated in each processing element. This arrangement allows a GF multiplication instruction, as described in more detail below, using the same generator polynomial for each GF multiplication, to cause 8 GF multiplications to be calculated simultaneously on each processing element by using 8 GF multiplication units 500. The GF multiplication instruction implemented for the MANARRAY™ architecture accomplishes the 8 GF multiplications by operating on packed data of 8 bytes producing 8 results on each processing element every cycle. With a four PE array, 32 GF multiplications can be obtained each cycle. For reasons of programming flexibility, the GF multiplication instruction also specifies 4 GF multiplications for operation on 4 bytes packed in 32-bit words and 8 GF multiplications for operations on 8 bytes packed in 64-bit double words.

Figure 6:
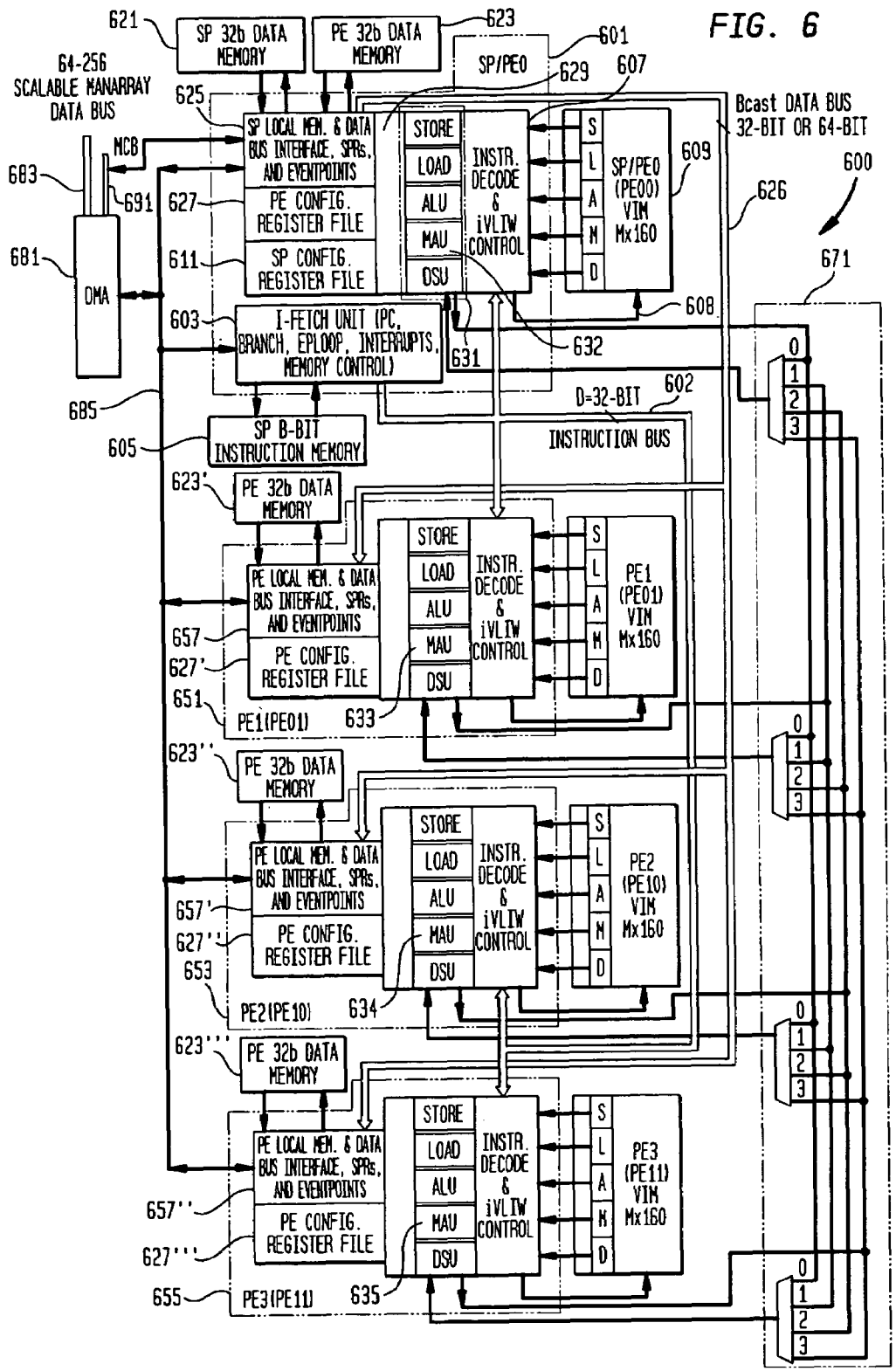
FIG. 6 illustrates a Manta-type processor, a subset of the ManArray architecture, which may be suitably adapted for use in conjunction with the present invention.

More specifically and in an illustrative embodiment of the present invention, an exemplary ManArray 2×2 iVLIW single instruction multiple data stream (SIMD) processor 600, representative of the Manta processor and mobile media processor (MMP) which are both subsets of the ManArray architecture, as shown in FIG. 6, may be adapted as described further below for use in conjunction with the present invention. Processor 600 comprises a sequence processor (SP) controller combined with a processing element-0 (PE0) to form an SP/PE0 combined unit 601, as described in further detail in U.S. Pat. No. 6,219,776. Three additional PEs 651, 653, and 655 are also labeled with their matrix positions as shown in parentheses for PE0 (PE00) 601, PE1 (PE01) 651, PE2 (PE10) 653, and PE3 (PE11) 655. The SP/PE0 601 contains an instruction fetch (I-fetch) controller 603 to allow the fetching of "short" instruction words (SIW) or abbreviated-instruction words from a B-bit instruction memory 605, where B is determined by the application instruction-abbreviation process to be a reduced number of bits representing ManArray native instructions. If an instruction abbreviation apparatus is not used, then B is determined by the SIW format.

The fetch controller 603 provides the typical functions needed in a programmable processor, such as a program counter (PC), a branch capability, and eventpoint loop operations. It also provides the instruction memory control which could include an instruction cache if needed by an application. In addition, the I-fetch controller 603 controls the dispatch of instruction words, such as a GF multiplication instruction, and instruction control information to the other PEs in the system by means of a D-bit instruction bus 602. D is determined by the implementation taking into account the SIW format, which for the exemplary ManArray coprocessor D=32-bits. The instruction bus 602 may include additional control signals as needed to distribute instructions to the multiple processing elements.

In this exemplary system 600, common elements are used throughout to simplify the explanation, though actual implementations are not limited to this restriction. For example, the execution units 631 in the combined SP/PE0 601 can be separated into a set of execution units optimized for the control functions of the SP. Fixed point execution units can be used in the SP, while PE0 and the other PEs can be optimized for a floating point application. For the purposes of this description, it is assumed that the execution units 631 are of the same type in the SP/PE0 and the PEs. The MAU execution units 632, 633, 634 and 635 each contain eight GF multiplication units, each of the type 500 shown in FIG. 5, for GF multiplication instruction execution capability. The MAUs provide the GF multiplication units with register file access interfaces. Each of the register files contained in the SP/PE0 and the other PEs are a common design PE configurable register file, 611, 627, 627', 627", and 627''', which is described in further detail in U.S. Pat. No. 6,343,356.

The SP/PE0 and the other PEs use a five instruction slot indirect very long instruction word (iVLIW) architecture which contains a VLIW instruction memory (VIM) 609 and an instruction decode and VIM controller functional unit 607 which receives instructions as dispatched from the SP/PE0's I-fetch unit 603 and generates VIM addresses and control signals 608 required to access the iVLIWs stored in the VIM. Referenced instruction types are identified by the letters SLAMD in VIM 609, where the letters are matched up with instruction types as follows: Store (S), Load (L), ALU (A), MAU (M), and DSU (D). The basic concept of loading the iVLIWs is described in further detail in U.S. Pat. No. 6,151,668. A VLIW, which may contain a GF multiplication instruction in the MAU slot position, may be indirectly accessed from a VIM and executed upon receipt in the SP and/or PEs of an execute VLIW (XV) SIW.

Due to the combined nature of the SP/PE0, the data memory interface controller 625 must handle the data processing needs of both the SP controller, with SP data in memory 621, and PE0, with PE0 data in memory 623. The SP/PE0 controller 625 also is the controlling point of the data that is sent over the 32-bit or 64-bit broadcast data bus 626. The other PEs 651, 653, and 655 contain common physical data memory units 623', 623", and 623''' though the data stored in them is generally different as required by the local processing done on each PE. The interface to these PE data memories is also a common design in PEs 1, 2, and 3 and controlled by PE local memory and data bus interface logic 657, 657' and 657". Interconnecting the PEs for data transfer communications is the cluster switch 671 various aspects of which are described in greater detail in U.S. Pat. Nos. 6,023,753, 6,167,501, and 6,167,502. The interface to a host processor, other peripheral devices, and/or external memory can be done in many ways. For completeness, a primary interface mechanism is contained in a direct memory access (DMA) control unit 681 that provides a scalable ManArray data bus 683 that connects to devices and interface units external to the ManArray core. The DMA control unit 681 provides the data flow and bus arbitration mechanisms needed for these external devices to interface to the ManArray core memories via the multiplexed bus interface represented by line 685. A high level view of a ManArray control bus (MCB) 691 is also shown in FIG. 6.

FIG. 7A shows an example of a finite field multiply instruction (MPYGF) encoding format 700 for use in conjunction with the ManArray system 600 described above with appropriate hardware circuitry to perform the calculations described above in detail. FIG. 7B shows a syntax/operation table 750 for the instruction encoding format 700 of FIG. 7A. The MPYGF instruction 700 calculates the remainder of the polynomial division of the product of two polynomials with coefficients from Galois field GF[2]. Four GF multiplications can be specified and calculated simultaneously as shown in syntax/operations description 752 and eight GF multiplications can be specified and calculated simultaneously as shown in syntax/operations description 754. The input polynomial coefficients are represented as bits in 4, or 8, unsigned bytes in source 32-bit registers Rx and Ry or 64-bit register pairs Rxe-Rxo, and pair Rye-Ryo, respectively. The results of the GF multiplication are stored in the corresponding bytes of register Rt, or Rte-Rto, respectively. The arithmetic scalar flags (ASFs), representing possible side effects of the MPYGF operation, are affected only by the least significant sub-operation of a packed data operation. The C, N and V flags are not affected by the least significant sub-operation while the Z flag is set to a 1 if the least significant sub-operation is a zero. Otherwise the Z flag is 0. The MPYGF instruction is defined to take 1 execution cycle.

A polynomial setup register (PSR) located in a register in a miscellaneous register file (MRF) extension 1 defined in the ManArray architecture to contain the generator polynomial (PSR.B0) and degree (PSR.B1) of the finite field, with the polynomial coefficients set as bits of byte PSR.B0. The generator polynomial must be loaded into the PSR using either a Load or a DSU instruction. Note that m cannot exceed 8 for this instruction due to the present hardware specification, but, as shown by Equation 7, there does not appear to be any algorithmic limitation to handling arbitrary values of m.

By way of example, to calculate sixteen $GF(2^5)$ multiplications of unsigned bytes stored in the compute register file registers Rx.B0 times Ry.B0 in a four PE system such as shown in FIG. 6, in the field generated by the generator polynomial $g(x)=x^5+x^2+1$, a program first loads the PSR byte 0 and byte 1 with the generator coefficients and m respectively, and then issues the mpygf instruction, mpygf.sm.4ub Rt, Rx, Ry to all four PEs. When the instruction is executed, four sets of m-bit results are stored in register file target register Rt in each PE. For example, one of the calculations in one of the PEs that executes the mpygf.sm.4ub Rt, Rx, Ry instruction could be Rx.B0=(11101) times Ry.B0=(10111) producing the result (11010) which is stored in the register file target register Rt.B0 755. Note that three other mpygf operations 757 also occur in parallel on this PE as specified by the quad operation mpygf instruction 700 and a total of sixteen GF multiplications occur in parallel on all four PEs.

A program or programs, that emulate a GF multiplication or use a GF multiplication instruction based on the principles of the present invention, can be stored in an electronic form on a computer useable medium which can include diskettes, CD-ROM, DVD-ROM, storage on a hard drive, storage in a memory device using random access memory, flash memory, Read Only Memory or the like, in downloadable form for downloading through an electronic transport medium, and the like.

While the present invention has been disclosed in the context of various aspects of presently preferred embodiments, it will be recognized that the invention may be suitably applied to other environments and applications consistent with the claims which follow.

We claim:

1. A method for Galois field ($GF(2^m)$) multiplication by a logic circuit, where m is a positive integer, and the $GF(2^m)$ multiplication operation calculates the multiplication of two polynomials producing a product which is divided by a generator polynomial, and wherein the multiplication of the two polynomials is combined with the division operation whereby the $GF(2^m)$ multiplication is computed as a single function $GF(2^m)$ multiplication operation, the method comprising:

generating $x^{m-i}$ polynomial coefficient terms from multiplication and division mathematical operations, where i is a variable;

combining $x^{m-i}$ polynomial coefficient terms having the same exponents from the multiplication and division mathematical operations to generate a recurrence relation that represents the combination of the multiplication and division operations;

computing the recurrence relation using the combined $x^{m-i}$ polynomial coefficient terms in the single function $GF(2^m)$ multiplication operation to produce a $GF(2^m)$ result; and storing the $GF(2^m)$ result in memory in a computer readable form.

2. The method of claim 1 wherein the recurrence relation for the single $GF(2^m)$ multiplication function is $Y(i)=Y(i-1)+(q_{m-i}*p+Y(i-1)_{2m-1}*g)*x^{m-i}$, $i=1, 2, \ldots, m$ and where $Y(0)=0$, $Y(i=m)$ is the $GF(2^m)$ result, p and q are coefficients of input polynomials p[x] and q[x], respectively, and g is the coefficients of a generator polynomial g[x].

3. The method of claim 1 further comprising:

computing the recurrence relation for a single $GF(2^m)$ multiplication function as $Y(i)$ $Y(i-1)+(q_{m-i}*p+Y(i-1)_{2m-1}*g$ $Y(i-1)_{m-1}*g)*x^{m-i}$, $i=1, 2, \ldots, m$ and where $Y(0)=0$, $Y(i=m)$ is the $GF(2^m)$ result, p and q are coefficients of input polynomials p[x] and q[x], respectively, and g is the coefficients of a generator polynomial g[x] in an m by m single function computation array utilizing m bits per internal calculation stage.

4. A method for Galois field ($GF(2^m)$) multiplication by a logic circuit, where m is a positive integer, and the $GF(2^m)$ multiplication operation calculates the multiplication of two polynomials producing a product which is divided by a generator polynomial, and wherein the multiplication of the two polynomials is combined with the division operation whereby the $GF(2^m)$ multiplication is computed as a single function $GF(2^m)$ multiplication operation, the method comprising:

generating $x^{m-i}$ polynomial coefficient terms from multiplication and division mathematical operations, where i is a variable;

combining $x^{m-i}$ polynomial coefficient terms having the same exponents from the multiplication and division mathematical operations to generate a recurrence relation that represents the combination of the multiplication and division operations;

computing the recurrence relation using the combined $x^{m-i}$ polynomial coefficient terms in the single function $GF(2^m)$ multiplication operation thereby calculating m by m bits for the $GF(2^m)$ multiplication function to produce an m bit $GF(2^m)$ result; and storing the m bit $GF(2^m)$ result in memory in a computer readable form.

5. The method claim 4 wherein the recurrence relation for the single $GF(2^m)$ multiplication function is $Y(i)=Y(i-1)+(q_{m-i}*p+Y(i-1)_{m-1}*g)*x^{m-1}$, $i=1, 2, \ldots, m$ and where $Y(0)=0$, $Y(i=m)$ is the m bit $GF(2^m)$ result, p and q are coefficients of input polynomials p[x] and q[x], respectively, and g is the coefficients of a generator polynomial g[x].

6. The method of claim 4 wherein the step of computing the recurrence relation is accomplished in an m by m single function computation logic array utilizing m bits per internal logic stage.

7. A GF multiplication circuit cell producing result $Y(i)_j$ for $i \in \{1, 2, \ldots, m\}$, $j \in \{0, 1, \ldots, m-1\}$, where m is a positive integer, and a selected i and j value comprising:

a bit $q_{m-i}$ selected from the set $\{q_{m-1}, q_{m-2}, \ldots, q_{m-i}, \ldots q_0\}$ of first product inputs based on the selected i value;

a bit $p_j$ selected from the set $\{p_{m-1}, p_{m-2}, \ldots, p_j, \ldots, p_0\}$ of second product inputs based on the selected j value;

a bit $g_j$ selected from the set $\{g_{m-1}, g_{m-2}, \ldots, g_j, \ldots, g_0\}$ of generator polynomial coefficients based on the selected j value;

a most significant bit $Y(i-1)_{m-1}$ of a previous stage of GF multiplication circuit cells results;

a value of the rightmost neighbor bit $Y(i-1)_{j-1}$ of a previous stage of GF multiplication circuit cell results, wherein the rightmost neighbor bit $Y(i-1)_{j-1}$ is in relation to the present GF multiplication circuit cell producing result $Y(i)_j$ for the selected i and j values;

a logic device producing $q_{m-i}$ AND $p_j$ as output A;

a logic device producing $Y(i-1)_{m-1}$ AND $g_j$ as output B; and a logic device producing A XOR B XOR $Y(i-1)_{j-1}$ as result $Y(i)_j$ to be utilized in one or more GF multiplication circuit cells or stored in a processor accessible storage unit.

8. The GF multiplication circuit cell of claim 7 disposed within an m-by-m array of interconnected GF multiplication circuit cells for producing a Galois Field ($2^m$) multiplication result Y, where m is a positive integer, further comprising:

input operand $q=(q_{m-1} \, q_{m-2} \cdots q_0)$;

input operand $p=(p_{m-1} \, p_{m-2} \cdots p_0)$;

input operand $g=(g_{m-1} \, g_{m-2} \cdots g_0)$;

the $Y(i-1)_{m-1}$ and the $Y(i-1)_{j-1}$ array border GF multiplication circuit cell input values set to 0; and output Y result which is stored in a computer readable form.

9. The CF multiplication circuit cell of claim 8 wherein the m-by-m array of interconnected GF multiplication circuit cells further comprises:

the interconnections of the GF multiplication circuit cells governed by the equation $Y(i)=Y(i-1)+(q_{m-i}*p+Y(i-1)_{m-1}*g)*x^{m-i}$, $i=1, 2, \ldots,$ m and where $Y(0)=0$.

10. The GF multiplication circuit cell of claim 8 wherein the m-by-m array of GF multiplication circuit cells is further disposed within a grouping of multiple m-by-m arrays in a processor execution unit and further comprises:

a GF ($2^m$) multiplication instruction with a data type field specifying at least one GF ($2^m$) multiplication operation; and means for connecting the multiple m-by-m arrays inputs and outputs for performing at least one GF ($2^m$) multiplication in the execution of the GF ($2^m$) multiplication instruction.

11. The GF multiplication circuit cell of claim 8 wherein the input operands $q=(q_{m-1} q_{m-2} \ldots q_0)$, $p=(p_{m-1} p_{m-2} \ldots p_0)$, and $g=(g_{m-1} g_{m-2} \ldots g_0)$ are connected to read outputs of at least one storage unit in a processor system.

12. The GF multiplication circuit cell of claim 8 wherein the output Y results are connected to at least one storage unit write inputs in a processor system.

13. The GF multiplication circuit cell of claim 11 wherein the at least one storage unit is a processor accessible register file.

14. The GF multiplication circuit cell of claim 13 wherein the at least one storage unit is a processor accessible register file.

* * * * *